UNITED STATES PATENT OFFICE.

JAMES MADISON BROWN, OF JOHNSON CITY, TENNESSEE.

CHLORATE EXPLOSIVE.

1,218,976.     Specification of Letters Patent.     Patented Mar. 13, 1917.

No Drawing.     Application filed March 3, 1915. Serial No. 11,862.

*To all whom it may concern:*

Be it known that I, JAMES MADISON BROWN, a citizen of the United States, residing at Johnson City, in the county of Washington and State of Tennessee, have invented certain new and useful Improvements in Chlorate Explosives; and I do hereby declare the following to be a full, clear, and exact description of the invention, such as will enable others skilled in the art to which it appertains to make and use the same.

This invention relates to a process for making a high powered powder, as well as to a novel product produced by said process, and has for its object to provide a method which will require less time to produce the finished powder and will also produce a safer product than the processes heretofore proposed.

With these and other objects in view the invention consists in the novel powder, as well as in the novel steps and combinations of steps constituting the process, all as will be more fully hereinafter disclosed and particularly pointed out in the claims.

In carrying out my process I may for example employ from say 6% to 12% of a varnish like mixture, composed of boiled linseed oil and rosin, about say 70% of sodium chlorate, or potassium chlorate, and about 22% of ordinary wheat flour or other grain flour or finely divided cellulose material.

In making up the varnish like material I prefer to take say one and one half parts by weight, of ordinary commercial rosin to each one part of boiled linseed oil, heat the rosin to about 160° C., and pour the oil in on the heated rosin when the mixture is thoroughly stirred and the rosin substantially dissolves in the oil, thus producing a varnish like mass.

I next add the chlorate to the varnish like mixture thus produced and thoroughly mix the same as by a stirring, or kneading action, whereupon I then add the flour and knead the mass into a powder like mixture. The mass now has an appearance of being damp, although no water has been added thereto, and I prefer to form it into cakes or into any other suitable form by means of a press or other mechanism, whereupon it may be dried at say 90° C. for four hours. The mass now begins to harden and if it is allowed to stand for say eighteen hours at room temperature it will be found to consist of a grayish cement like material which can be readily cracked into grains, and the grains sifted or sorted to size whereupon a finished rifle powder of great power is had.

The powder thus produced is found to be a free running powder when subjected to say 70° C., it is not sensitive to moisture even when sodium chlorate is employed, it is not sensitive to impact as the chlorates generally are and it is substantially smokeless when fired from a gun. Further it does not clog the gun and seems to have very little or no solid residue.

In mixing the above ingredients I prefer to employ 8% of the oil and rosin varnish material and say 70% of the sodium or potassium chlorate and about say 22% of the flour. When these proportions are used it is found that the gases given off for explosion are almost entirely carbon monoxid and only a very small percentage of carbon dioxid is present.

Owing to the comparative inexpensiveness of the ingredients, this powder is sufficiently inexpensive to compete with dynamite for blasting purposes.

Instead of the above proportions and ingredients, I may vary the formula somewhat by adding carbon to the mixture. In such case I prefer to employ say from 8% to 12% of the varnish like mixture of oil and rosin, 10% producing the best results. I further find that instead of 70% sodium or potassium chlorate it is desirable to use 76% of the said potassium or sodium chlorate. The flour may be reduced in such case to 10% and as for carbon any suitable form may be used, lamp black being preferred and it may be 4% of the weight of the finished product. The carbon is conveniently added in the above process immediately after the flour. The product produced by this second formula is black in appearance and when cracked into grains it closely resembles the ordinary black powder of commerce. Said second product like the preceding powder is found to be proof against moisture, insensitive to shock and also to be of great power. It gives off slightly more smoke upon firing in a rifle than does the preceding powder but it does not gum up the gun nor does it leave an objectionable amount of solid residue. It further burns to about the same proportion of carbon monoxid gas as does the preceding powder. In other words it will be observed that I am enabled to produce in say less than 24 hours a complete powder of high power and of great safety which is useful for either blasting or rifle purposes, and am enabled to use either a sodium chlorate or a potassium chlorate for its base which is a result I believe to be new in this art.

The function of the rosin in addition to coating the chlorate grains and thereby rendering them insensitive to shock is to cause the mass to harden and become brittle. It is found when too little rosin is used it takes a much longer time for the mass to harden sufficiently to crack into grains, and when a greater proportion of rosin is attempted great difficulty is experienced in getting it into solution. Since the chlorate is first put into the solution of rosin and oil, the individual grains, of course, are thoroughly coated and thereby protected from shock as well as from moisture.

It is obvious that those skilled in the art may vary the details of the process without departing from the spirit of the invention and therefore I do not wish to be limited to the above disclosure except as may be required by the claims.

What I claim is:

1. The process of producing a high powdered powder which consists in preparing a solution of substantially 8% to 10% of rosin and boiled linseed oil; mixing substantially 70% to 76% sodium chlorate in said solution; and adding 22% to 14% of grain flour to the mass thus produced, substantially as described.

2. The process of producing a high powdered powder which consists in preparing a solution of substantially 8% to 10% of rosin and boiled linseed oil; mixing substantially 70% to 76% sodium chlorate in said solution; adding a grain flour to the mass thus produced; adding substantially 4% of finely divided carbon; subjecting the mass to pressure; and cracking the same into grains, substantially as described.

3. The herein described new explosive comprising by weight rosin dissolved in linseed oil 10%; sodium chlorate substantially 70%; and cereal flour substantially 20%, substantially as described.

In testimony whereof I affix my signature, in presence of two witnesses.

JAMES MADISON BROWN.

Witnesses:
T. A. WITHERSPOON,
C. W. FOWLER.

Copies of this patent may be obtained for five cents each, by addressing the "Commissioner of Patents, Washington, D. C."